United States Patent [19]

Kagami et al.

[11] Patent Number: 5,402,402
[45] Date of Patent: Mar. 28, 1995

[54] APPARATUS FOR CONTROLLING A OPTICAL DISK DRIVE

[75] Inventors: Naoyuki Kagami, Fujisawa; Hiroaki Kubo, Atsugi; Makoto Takekoshi, Yokohama, all of Japan

[73] Assignee: International Business Machines Corporation, Armonk, N.Y.

[21] Appl. No.: 26,238

[22] Filed: Mar. 1, 1993

Related U.S. Application Data

[63] Continuation of Ser. No. 755,966, Sep. 6, 1991, abandoned.

[30] Foreign Application Priority Data

Sep. 27, 1990 [JP] Japan ............... 2-255465

[51] Int. Cl.⁶ ........................... G11B 7/00
[52] U.S. Cl. ............... 369/44.28; 369/44.32; 369/32
[58] Field of Search ............ 369/32, 44.28, 30, 41, 369/44.32, 44.29, 60; 360/77.03, 78.05, 78.06, 51

[56] References Cited

U.S. PATENT DOCUMENTS

| | | | |
|---|---|---|---|
| 4,562,562 | 12/1985 | Moriya et al. | 369/44.28 |
| 4,611,316 | 9/1986 | Takeuchi et al. | 369/44.32 X |
| 4,627,039 | 12/1986 | Meyer | 369/44.28 |
| 4,785,439 | 11/1988 | Okada et al. | 369/44.28 |
| 4,858,221 | 8/1989 | Roméas | 369/44.11 X |
| 4,860,271 | 8/1989 | Yokogawa et al. | 369/44.25 X |
| 4,864,552 | 9/1989 | Getreuer et al. | 360/77.03 |
| 4,866,687 | 9/1989 | Kasai et al. | 360/78.05 |
| 5,012,460 | 4/1991 | Popovich et al. | 369/44.34 X |
| 5,063,549 | 11/1991 | Yamamuro | 369/44.28 |
| 5,084,661 | 1/1992 | Tanaka | 369/44.28 X |
| 5,109,366 | 4/1992 | Moriya et al. | 369/32 |
| 5,181,194 | 1/1993 | Horie | 369/44.25 |

FOREIGN PATENT DOCUMENTS

| | | |
|---|---|---|
| 0324859 | 6/1988 | European Pat. Off. . |
| 0363195 | 4/1990 | European Pat. Off. . |
| 011431 | 1/1990 | Japan . |

*Primary Examiner*—Aristotelis Psitos
*Assistant Examiner*—Thang V. Tran
*Attorney, Agent, or Firm*—D. A. Shifrin

[57] ABSTRACT

An optical disk drive apparatus operable under track following mode and seek mode wherein, upon the detection of a track following operation error, a seek operation is initiated for seeking a new target track at a predetermined number of tracks distant from the current track. The seek operation is controlled to follow a velocity profile thus regaining control over an optical head that may have been jolted into an out of control velocity when the track following error occurred. The velocity profile provides for a reduced velocity as the target track is approached. The new target track is selected at a relatively large number of tracks distant from the current track if the head velocity is high and at a relatively small number of current tracks if the head velocity is low. If the current track is sensed to be an outer track, the new target track is selected toward the inner track and if the current track is sensed to be an inner track, the new target track is selected to be an outer track.

14 Claims, 4 Drawing Sheets

APPARATUS FOR CONTROLLING A OPTICAL DISK DRIVE

This is a continuation of U.S. application Ser. No. 07/755,966, filed Sep. 6, 1991, now abandoned.

This invention relates to an optical disk drive apparatus, and is particularly concerned with means for recovering control over an optical head when a track following operation fails.

BACKGROUND OF THE INVENTION

In an optical disk drive apparatus, it is common to generate a track error signal (TES) to indicate the positional deflection value of a spot of a laser beam from a track center. In track following operation mode wherein an optical head (beam) follows a track, the movement of the optical head is controlled so that the value of TES remains zero. However, a track following operation sometimes fails due to a disturbed TES caused by an external mechanical shock or vibration, etc. or a flaw or fault, etc. on an optical disk.

In a conventional method, a tracking servo is interrupted when the failure of track following operation is detected. In such a conventional method, it is impossible to recover a track following operation since the TES remains at a high frequency, as shown in FIG. 6. Further, in a conventional method, it is sometimes impossible to recover a track following operation, as shown in FIG. 7, since a TES cannot be obtained because the optical head is run into the mirror part of an optical disk during the interruption. Accordingly, in such a conventional method, the initial operation is required to restart after the optical head is stopped and a long time to recover the track following is required.

Japanese Published Unexamined Patent Application (PUPA) No. 63-179476 discloses an apparatus wherein upon switching a tracking servo from off to on, a velocity servo is firstly operated for a predetermined period of time in order to decrease the frequency of the TES before the tracking servo operation is started. This prior art does not relate to the recovery of the track following operation after interruption.

SUMMARY OF THE INVENTION

An object of this invention is to ensure that a track following operation can be recovered in a short time when the track following operation fails.

According to this invention, in an optical disk drive apparatus having an optical head for projecting a laser beam onto an optical disk includes seek control means for moving the beam from a current track to a target track while crossing tracks, tracking control means for making the beam follow a track, and tracking error detecting means for detecting the failure of a track following operation, wherein a seek operation under which a new target track at a predetermined distance from the current track is sought by said seek control means in response to the failure of the track following operation detected by the tracking error detection means. As approach is made to the new target track the speed of beam movement is decreased during the seek operation. Thus, even if the beam initially moves out of control at a high speed when the track following operation fails, control is reestablished in a short time.

Further, according to this invention, in an optical disk drive apparatus having an optical head for projecting a laser beam onto the recording surface of an optical disk, seek control means for moving the beam from a current track to a target track crossing tracks, tracking control means for making the beam follow a track, and tracking error detection means for detecting the failure of the track following operation, a seek operation is performed by the seek control means in response to a failed track following operation detected by the tracking error detection means so that a track at a predetermined distance toward the inside of the optical disk in the radial direction of the optical disk can be a target track if a current position is toward the outside of the optical disk in the radial direction and, on the other hand, a track at a predetermined distance toward the outside of the optical disk in the radial direction can be a target track if a current position is toward the inside of the optical disk in the radial direction, to prevent a beam from running into the mirror part of the disk during recovery for the track following operation.

The foregoing and other features and advantages of the invention will be apparent from the following more particular description of the preferred embodiment of the invention, as illustrated in the accompanying drawings.

DETAILED DESCRIPTION

In the following, the preferred embodiment of this invention is described referring to drawings.

Figure 3:
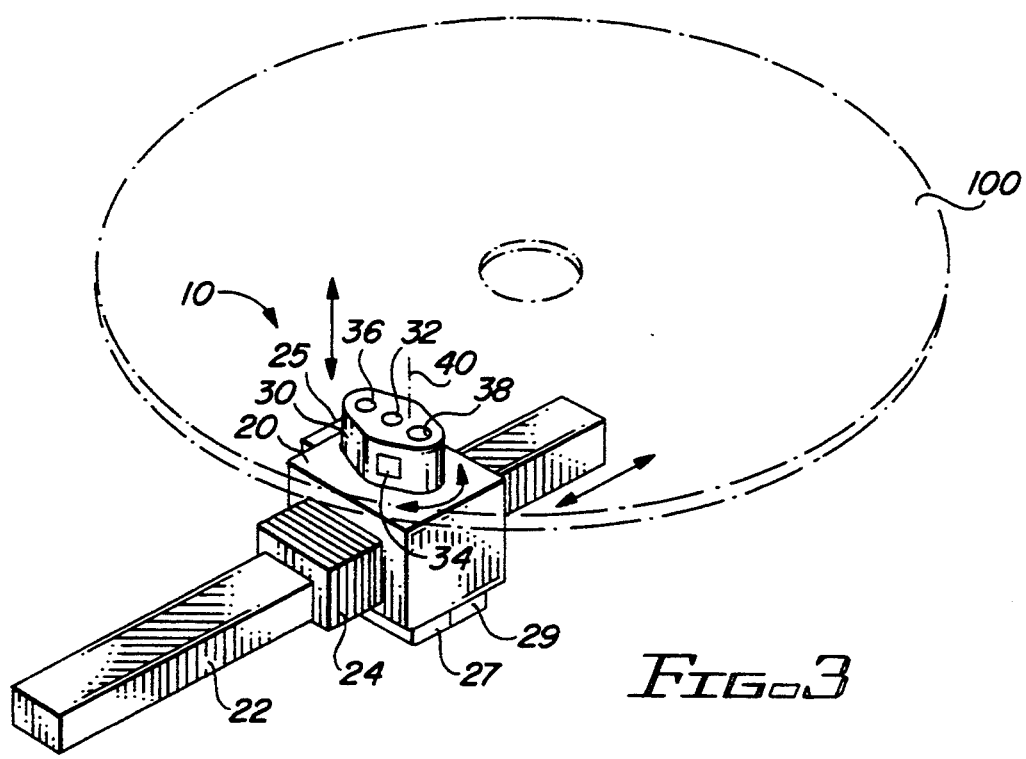
FIG. 3 is a perspective view showing the optical head of the embodiment of FIG. 1.

FIG. 3 shows a part of an embodiment of an optical disk drive apparatus concerned with this invention. In the figure, an optical head 10 is composed of a coarse actuator 20 and a fine actuator 30. The coarse actuator 20 is supported by a rail 22 so that it can move freely in the radial direction of an optical disk 100 (in the direction of a seek operation), and is driven in the direction of the seek operation by a coarse actuator VCM (Voice Coil Motor) 24.

The fine actuator 30 is supported by the coarse actuator 20 through a shaft 32 so that it can move in the focusing and tracking directions and is driven in the focusing direction and in the tracking direction by a focus VCM 34 and a tracking VCM 36, respectively. The fine actuator 30 has an objective lens 38 fixed from which a laser beam 40 is projected onto the optical disk 100.

Also, the coarse actuator 20 is provided with a relative position (RPE) detecting sensor 25, a focus error signal (FES) detecting sensor 27, and a tracking error signal (TES) detecting sensor 29. The relative position error (RPE) detecting sensor 25 which is, for example, a photo sensor with two split sensitive parts detects the quantity of a relative deflection (rotational deflection from a neutral position) of the fine actuator 30 from the coarse actuator 20. The focus error signal (FES) detecting sensor 27 which is, for example, a photo sensor with four split sensitive parts detects a positional difference of a spot of the laser beam 40 from a focusing point on the optical disk 100. The tracking error signal (TES) detecting sensor 29 which is, for example, a photo sensor with two split sensitive parts detects the positional deviation of a spot of the laser beam 40 from the track center on the optical disk 100.

Figure 4:
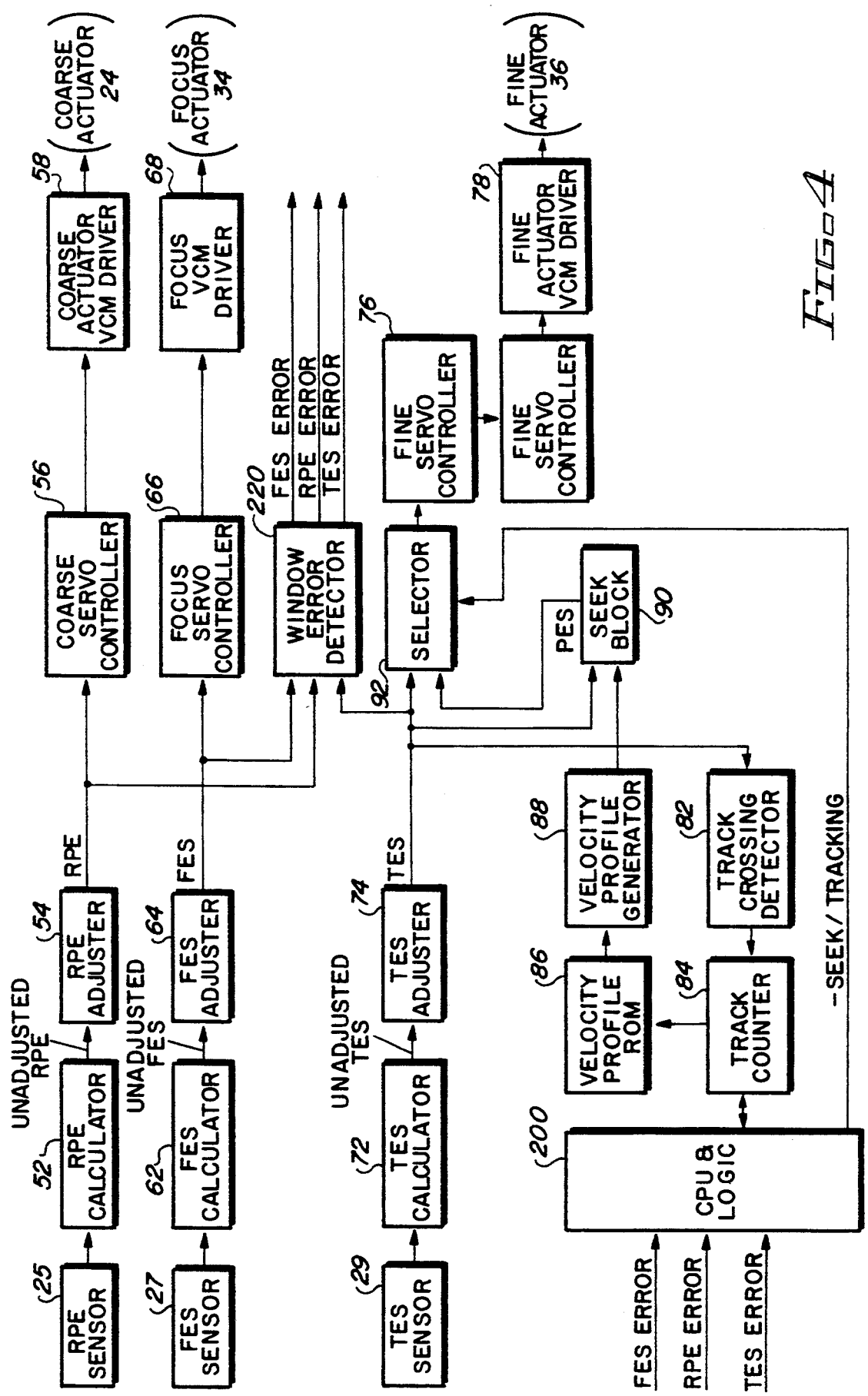
FIG. 4 is a block diagram showing control components of the optical disk drive embodiment.

FIG. 4 shows another part of the embodiment. In the figure, an output of the relative position error (RPE) detecting sensor 25 is input to an RPE calculator 52. The RPE calculator 52, if the RPE detecting sensor 25 is, for example, a photo sensor with two split sensitive parts, calculates the difference between detecting signals from the two photo-sensitive parts and then outputs an unadjusted or raw RPE. When the gain and the offset of the raw (unadjusted) RPE is adjusted by a RPE adjuster 54, an adjusted RPE can be obtained and the adjusted RPE is provided to a coarse servo controller 56 and a tracking servo controller 76.

The RPE, after low-pass filtering and compensation for phase progress by the coarse servo controller 56, is provided to a coarse actuator VCM driver 58 from which driving current according to the amplitude and the sign of the RPE, that is, the quantity and the direction of a deflection of the fine actuator 30 to the coarse actuator 20 is provided to the coarse actuator VCM 24.

An output of the FES detecting sensor 27 is input to a FES calculator 62. The FES calculator 62, for example, if the FES detecting sensor 27 is a photo sensor with four split sensitive parts, calculates a difference between a sum of detecting signals from a pair of two photo sensitive parts diagonally positioned from each other and a sum of detecting signals from another pair of two photo-sensitive parts diagonally positioned from each other and then outputs an unadjusted or raw FES. When the offset of the raw (unadjusted) FES is adjusted by a FES adjuster 64, an adjusted FES can be obtained. The FES is provided to a focus servo controller 66.

The FES, after low-pass filtering and compensation for phase progress by the focus servo controller 66, is provided to a focus VCM driver 68 from which driving current according to the amplitude and sign of the FES, that is, the positional deviation and the direction of a spot of the laser beam 40 from the focus point is provided to the focus VCM 34.

An output of the TES detecting sensor 29 is input to a TES calculator 72. The TES calculator, for example, if the TES detecting sensor 29 is a photo sensor with two split sensitive parts, calculates the difference between detecting signals from the pair of two photo sensitive parts to output an unadjusted or raw TES. When the gain and the offset of the raw (unadjusted) TES are adjusted by the TES adjuster 74, an adjusted TES can be obtained and the TES thus obtained is provided to the tracking servo controller 76, a tracking VCM driver 78 providing a driving signal for tracking to the tracking VCM 36.

Also, the adjusted TES is input to a track cross detector 82 in which the number of times that the optical head 10 (that is, a beam spot) crosses tracks is detected based on a waveform of the TES and from which the result of detection is provided to a track counter 84. At the start of seek operation, a servo system controller (CPU plus logic circuit) 200 provides a value indicating a track distance from a current position to a target position to the track counter 84. A value contained in the track counter 84 is decreased by subtraction each time the optical head 10 crosses a track during the seek operation.

Figure 5:
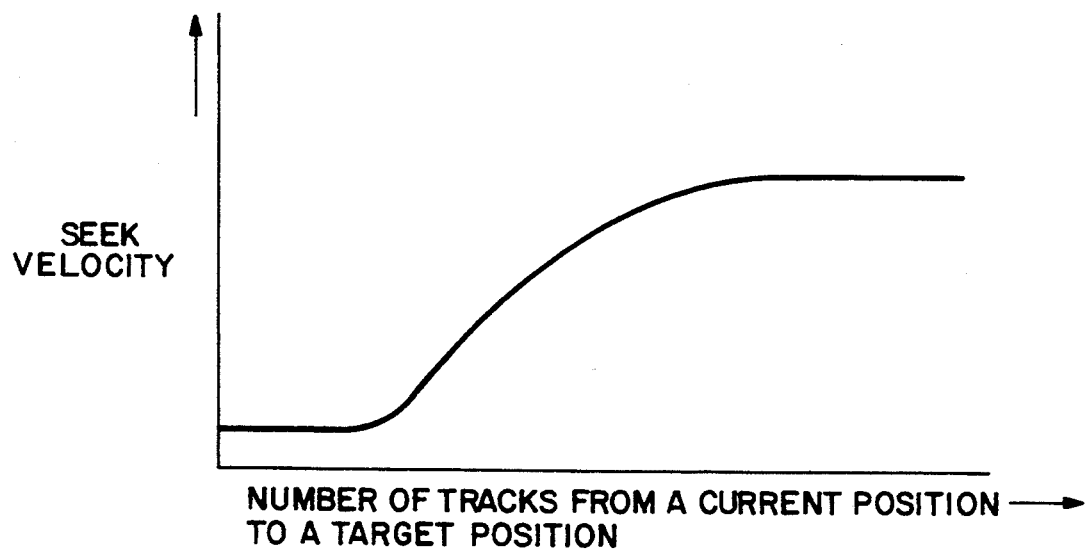
FIG. 5 is a graph showing a velocity profile of the embodiment of FIG. 1.

The controller 200 is provided with a velocity profile from ROM 86 in which information, for example, the relation between a track distance from the current position to the target position and a desired velocity, as in FIG. 5, used for controlling the seek velocity is stored. When information about the current position is provided based on the value of the track counter 84, the velocity profile ROM 86 outputs a desired velocity, represented as a digital value, at the current position to a velocity profile generator 88 in which the digital value is converted to an analog value to output the analog value to a seek block 90. The seek block 90 compares the value obtained from the velocity profile generator 88 with the current velocity information conveyed by the TES to produce a positioning error signal (PES) which is an integrated value of the result of the comparison. The PES is provided to a selector 92 to which the TES as well as the PES is provided. In seek operation mode, the selector 92 provides the PES to the fine servo controller 76. On the other hand, in tracking operation mode, the selector 92 provides the TES to the fine servo controller 76. In seek operation mode, the selector 92 may provide PES to not only the fine servo controller 76 but the coarse servo controller 56.

The adjusted RPE, FES, and TES are each provided to a window error detector 220. The window error detector 220 checks if each amplitude of the RPE, the FES, and the TES is within a predetermined range and generate a RPE error signal, a FES error signal, and a TES error signal indicating failed track following, respectively, if the amplitude of the RPE, FES, and TES is not within the predetermined range. The RPE error signal, the FES error signal, and the TES error signal thus generated are each provided to the controller 200.

The RPE error signal indicates that an angle representing the rotational deflection of the fine actuator 30 to the coarse actuator 20 is too large, therefore, it is necessary to return the fine actuator 30 to the neutral position and retry the focus acquisition operation. When the FES error signal is generated, focusing is not in a good state and a small TES amplitude shows that track following is not properly made. Accordingly, to avoid writing at an erroneous track position in write mode, a write operation is inhibited when the FES error signal is generated.

When the TES error signal, which indicates that a track following operation error has been detected, occurs during a track following operation, recovery for the track following operation is to be executed.

Figure 1:
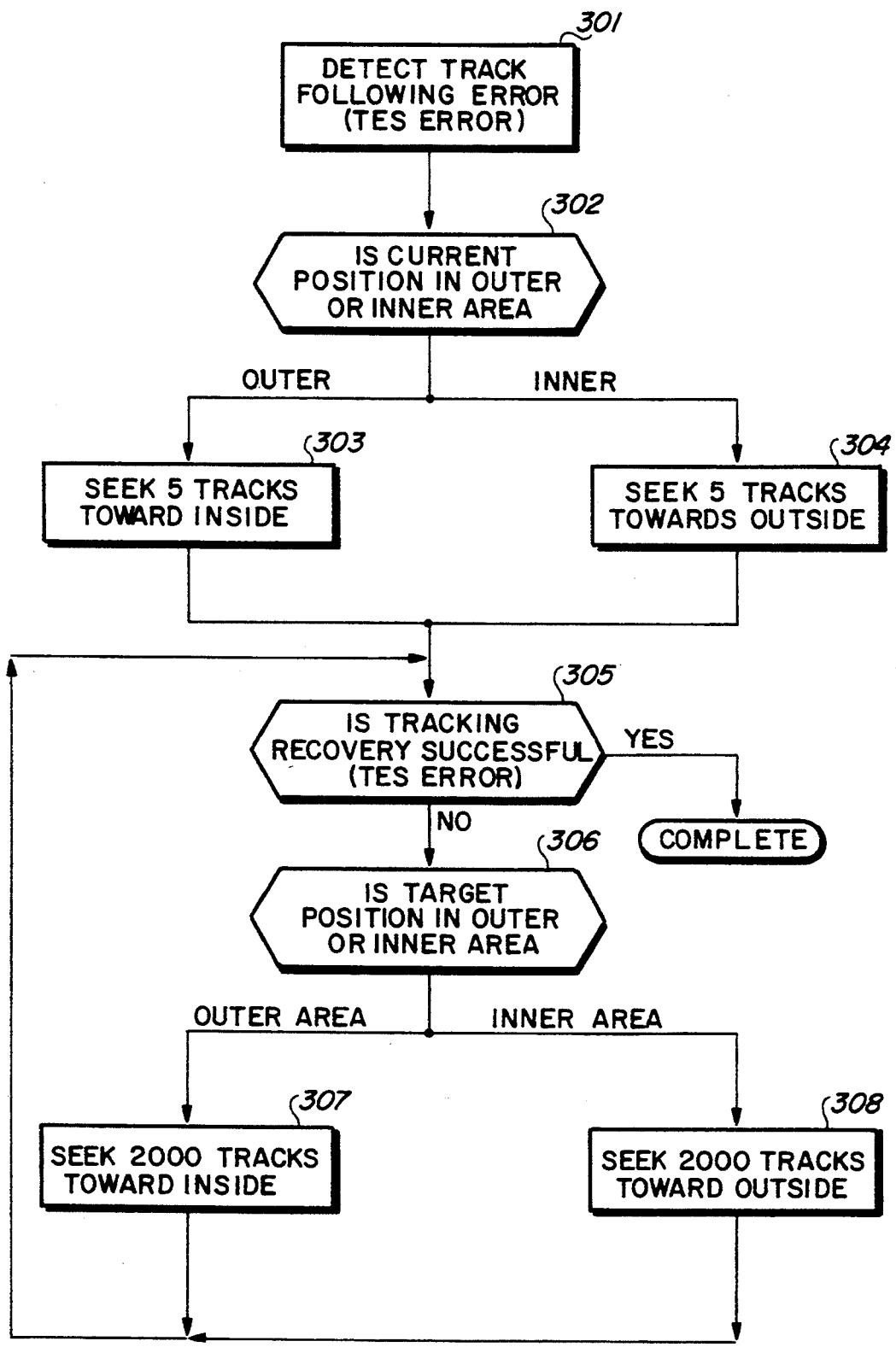
FIG. 1 is a flowchart showing the main steps of a method for recovering a track following operation in an embodiment of this invention concerning an optical disk drive apparatus.

In the following, a method for recovering a track following operation is described by reference to FIG. 1 as well as FIG. 4. During a track following operation, the amplitude of a TES is controlled so as to remain zero, however, the amplitude of the TES becomes large and a TES error signal is generated if the track following operation fails, and a track following operation error is detected by the controller 200 to which the TES error signal is provided (Processing block 301). The controller 200 which has detected the TES error signal determines if a current position is in the outer area within the optical disk 100 or the inner area within the optical disk 100 (Decision block 302). The above-mentioned "current position" refers to as, for example, the most-recent read information at the current position, "the current position is in the outer area within the optical disk 100" means that the current position is in the outer part which occupies more than a half of the total number of tracks on the optical disk 100, and "the current position is in the inner area within the optical disk 100" means that the current position is in the inner part which occupies less than a half of the total number of tracks on the optical disk 100. If the current position is in the outer area of the optical disk 100, a seek operation is performed so that a position at the distance of 5 tracks toward the inside of the optical disk 100 can be a target position (Processing block 303). On the other hand, if the current position is in the inner area of the optical disk 100, the seek operation is performed so that a position at the distance of 5 tracks toward the outside of the optical disk 100 can be a target position (Processing block 340).

During a seek operation, the movement velocity of the beam 40 is controlled according to a velocity profile (FIG. 5) and the seek operation can change to a track following operation whether the velocity becomes zero or a value other than zero, when the beam 40 passes through 5 tracks.

The controller 200 determines if the recovery for the track following operation is successful by checking to see if the TES error signal is still generated (Decision block 305). If tracking recovery is successful, a series of recovery operations are completed, and otherwise, the controller 200 determines if a target position in a processing block 303 or 304 is toward the outside or inside of the optical disk 100 (Processing block 306) and then a seek operation under which a position at the distance of 2000 tracks toward the inside of the optical disk 100 is a target position is performed if said target position is toward the outside of the optical disk 100 (Processing block 307) and, on the other hand, a seek operation under which a position at the distance of 2000 tracks toward the outside of the optical disk 100 is a target position is performed if said target position is toward the inside of the optical disk 100 (Processing block 308). When a track following operation error is detected immediately after a seek operation has changed to a track following operation, a seek operation under which a position at the distance of 2000 tracks is a target position is performed to recover the track following operation, as shown above. Accordingly, in a case where a seek operation changes to a track following operation, even if the beam 40 moves out of control, the velocity of the beam 40 can be sufficiently controlled along the curve of the velocity profile (FIG. 5) during the seek operation for 2000 tracks to facilitate successful recovery for the track following operation.

If the recovery for a track following operation fails again after a seek operation under which a position at the distance of 2000 tracks is a target position, the seek operation with target of a 2000 tracks distance is repeated by a predetermined number of times.

Figure 2:
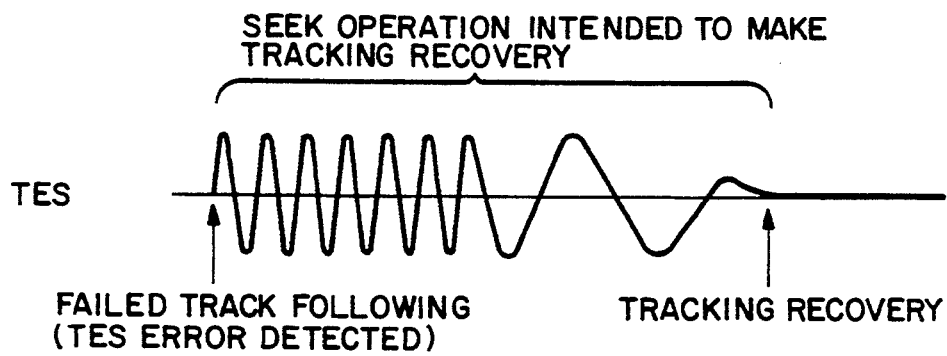
FIG. 2 is a chart showing a waveform of the track error signal (TES) in the embodiment of FIG. 1.
Figure 6:
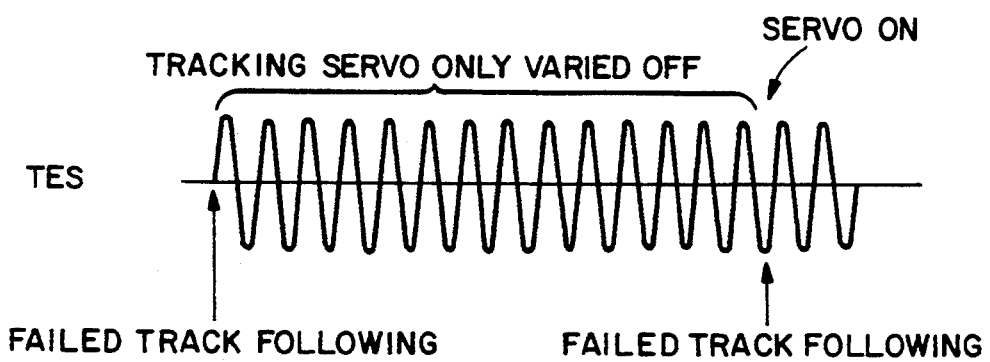
FIG. 6 and FIG. 7 are charts showing waveforms of TES for the recovery for track following operation in a conventional apparatus.
Figure 7:
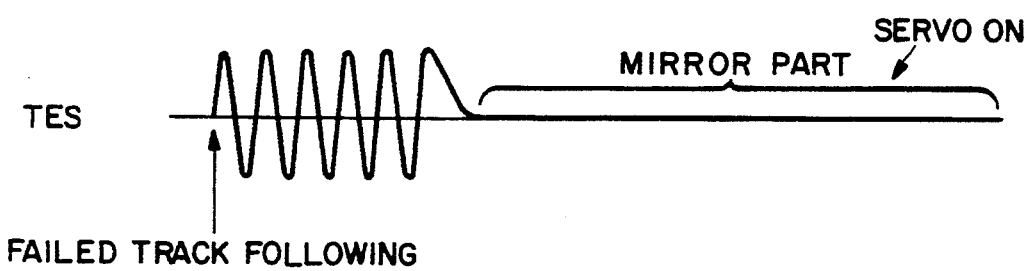

FIG. 2 shows a waveform of TES under the operation for the track following recovery. As is obvious from the figure, the frequency of TES decreases gradually in the second half of the period of a seek operation intended to recover the track following operation. This means that the recovery for the track following operation is made smoothly.

According to the above embodiment, servo control loop is not opened after a track following error (TES error) has been detected, therefore the track following operation can be smoothly recovered under the condition where there is an external disturbance, mechanical vibration, or an irregular phenomenon caused by an optical disk mounted on a slant, etc.

It will be recognized that servo control loop is not opened for a moment after a track following error (TES error) has been detected, the recovery for a track following operation can be made in a short time.

It will be appreciated also that in a seek operation intended to recover a track following operation, either "short" (5 tracks) or "long" (2000 tracks) can be selected according to the expected velocity of the beam 40 (optical head 10) at a time when a track following error has been detected so that the recovery for the track following operation can be made in a short time in accordance with the situation.

It will be appreciated also that according to a seek operation intended to make tracking recovery, there is little danger of running the beam 40 (optical head 10) into the mirror part on the innermost circumference or the outermost circumference of the optical disk 100, since the seek operation for tracking recovery can be varied to either "toward the inside" or "toward the outside" of the disk 100 depending upon whether a current or a target position is toward the outside or the inside of the disk 100, respectively.

In the above embodiment, a target distance in the seek operation intended to make the tracking recovery is varied depending upon whether the recovery is made during a track following operation or for a track following operation immediately after a seek operation changes to the track following operation, however, it will be appreciated that the target distance may be varied based on information about the movement velocity of the beam 40.

While the invention has been particularly shown and described with reference to a preferred embodiment thereof, it will be understood by those skilled in the art that various changes in form and details may be made therein without departing from the spirit and scope of the invention.

What is claimed is:

1. An optical disk drive apparatus comprising:
   an optical head for projecting a laser beam onto an optical disk;
   coarse actuator means connected to said optical head for moving said optical head to a target track during a track seeking operation;
   fine actuator means connected to said optical head for moving said optical head to keep said head accurately positioned on said target track during a track following operation;
   tracking error detection means connected to said fine actuator means for detecting the failure of the track following operation, said tracking error detection means comprising means for generating a tracking error signal (TES) and means, coupled to receive the tracking error signal, for comparing an amplitude of the TES with a range of acceptable amplitudes and generating a TES error signal if the TES amplitude is outside of the range of acceptable amplitudes, the TES error signal indicative of the failure of the track following operation; and
   processor means, connected to control said optical head, said coarse actuator means, said fine actuator means and said tracking error means and responsive to the detection of the failure of the track following operation, for initiating a new seek operation to a new target track at a predetermined distance from a current track in order to recover from the failure.

2. The apparatus of claim 1 wherein said predetermined distance is established by said processor means at a relatively long distance if said detection of the failure occurs immediately after the track seeking operation by said coarse actuator means and a relatively short distance if said detection occurs during the track following operation.

3. The apparatus of claim 2 wherein said processor means contain means for establishing said new target at a predetermined number of tracks toward the inside of said optical disk in the radial direction if said current track is toward the outer tracks on said disk, and wherein said processor means contain means for establishing said new target track at a predetermined number of tracks toward the outside of said optical disk in the radial direction if said current track is toward the inside of said disk.

4. The apparatus of claim 1 wherein said means for generating a TES error signal comprises a window error detector.

5. An optical disk drive apparatus having an optical head for projecting a laser beam onto an optical disk comprising:
   seek control means for moving said beam from a current track to a target track while crossing tracks;
   tracking control means for making said beam follow a track;
   tracking error detection means for detecting the failure of a track following operation, said tracking error detection means comprising means for generating a tracking error signal (TES) and means, coupled to receive the tracking error signal, for comparing an amplitude of the TES with a range of acceptable amplitudes and generating a TES error signal if the TES amplitude is outside of the range of acceptable amplitudes, the TES error signal indicative of the failure of the track following operation; and
   said seek control means comprising means for initiating a new seek operation to a new target track at a predetermined distance in response to the error detection in the track following operation by said track error detection means.

6. The apparatus of claim 5 wherein said means for generating a TES error signal comprises a window error detector.

7. The optical disk drive apparatus as recited in claim 5 wherein the predetermined distance is relatively long if the beam moves at a high velocity and relatively short if the beam moves at a low velocity.

8. The optical disk drive apparatus as recited in claim 5 wherein the predetermined distance being relative long if an error in the track following operation has been detected immediately after the seek operation has changed to the track following operation and being relative short if the error in the track has been detected during the track following operation.

9. The optical disk drive apparatus as recited in claim 5 wherein the track at the predetermined distance is toward the inside of the optical disk in the radial direction if a current position is in or a target position is toward the outside of the optical disk in the radial direction and toward the outside of the optical disk in the radial direction if the current position is in or the target position is toward the inside or the optical disk in the radial direction.

10. An optical disk drive apparatus having an optical head for projecting a laser beam onto an optical disk comprising:
    seek control means for performing a seek operation to move the beam from a current track to a target track under the control of seek velocity according to information in a velocity profile;
    tracking control means for making the beam follow a track;
    tracking error signal generating means for generating a tracking error signal indicating a deflection of said beam from a track center; and
    tracking error detection means for comparing the amplitude of the tracking error signal with a predetermined amplitude and generating a track following error signal when the amplitude of the tracking error signal or a signal derived therefrom exceeds the predetermined amplitude, the track following error signal indicative of a failure of the track following; and
    said seek control means comprising means for initiating a new seek operation to a predetermined distant track in response to the track following error signal.

11. The optical disk drive apparatus as recited in claim 10 wherein a predetermined distance between a current track and the predetermined distant track is relatively long if the beam moves at a high velocity while being relatively short if the beam moves at a low velocity.

12. The optical disk drive apparatus as recited in claim 11 wherein the target track being at a first predetermined distance during a track following operation while being at a second predetermined distance longer than the first distance immediately after a seek operation changes to a track following operation.

13. The optical disk drive apparatus as recited in claim 12 wherein the seek operation is performed by the seek control means in response to the track following error signal so that a track at a predetermined distance toward an inner circumference of an optical disk can be a target track if a current or target position is on an outer circumference of the optical disk and a track at a predetermined distance toward an outer circumference of the optical disk can be a target track if the current or target position is on an inner circumference of the optical disk.

14. The apparatus of claim 10 wherein said tracking error detection means comprises a window error detector.

* * * * *